(12) United States Patent
Durecu et al.

(10) Patent No.: US 7,248,396 B2
(45) Date of Patent: Jul. 24, 2007

(54) LARGE BANDWIDTH OPTICAL PARAMETRIC AMPLIFIER

(75) Inventors: Anne Durecu, Marcoussis (FR); Christian Simonneau, Antony (FR)

(73) Assignee: Alcatel, Paris (FR)

( * ) Notice: Subject to any disclaimer, the term of this patent is extended or adjusted under 35 U.S.C. 154(b) by 35 days.

(21) Appl. No.: 11/174,584

(22) Filed: Jul. 6, 2005

(65) Prior Publication Data

US 2006/0044643 A1    Mar. 2, 2006

(30) Foreign Application Priority Data

Sep. 2, 2004    (EP)    ................... 04292118

(51) Int. Cl.
*G02F 1/35*    (2006.01)
(52) U.S. Cl. ...................... 359/330; 359/326
(58) Field of Classification Search ................ 359/326, 359/330, 345, 346
See application file for complete search history.

(56) References Cited

U.S. PATENT DOCUMENTS

| | | | |
|---|---|---|---|
| 5,604,618 A * | 2/1997 | Mori et al. ................. | 398/150 |
| 6,344,921 B1 * | 2/2002 | Galvanauskas et al. ..... | 359/332 |
| 2006/0045445 A1 * | 3/2006 | Watanabe .................... | 385/122 |
| 2006/0051100 A1 * | 3/2006 | Watanabe .................... | 398/152 |

OTHER PUBLICATIONS

Marhic M et al., Optical Society of America/ Institute of Electrical and Electronics Engineers: "Interleaver-based method for full utilization of the bandwidth of fiber optical parametric amplifiers and wavelength converters." Optical Fiber Communication Conference. (OFC). Postconference Digest. Atlanta, Ga, Mar. 23-28, 2003, Trends in Optics and Photonics Series. (TOPS), Washington, DC: OSA, US, vol. TOPS. vol. 86, Mar. 23, 2003, pp. 510-511, XP010680315.

* cited by examiner

*Primary Examiner*—Hemang Sanghavi
(74) *Attorney, Agent, or Firm*—Sughrue Mion, PLLC (57) ABSTRACT

WDM optical signals are amplified using optical parametric amplification by applying an appropriate separation of those optical signals according to their carrier angular frequencies. These angular frequencies are within the two principal amplification bands defined by the non-linear optical medium used for optical parametric amplification. It is advantageously proposed to launch into the non-linear optical medium in one direction the optical signals of carrier frequencies within the one amplification band, and in the opposite counter-propagating direction the optical signals of carrier angular frequencies within the other amplification band. The required pump radiation is launched co-linearly with the respective optical signals to be amplified.

11 Claims, 5 Drawing Sheets

LARGE BANDWIDTH OPTICAL PARAMETRIC AMPLIFIER

TECHNICAL FIELD

The present invention relates to a method for amplifying wavelength division multiplexed optical signals by using an optical device comprising a non-linear optical medium for optical parametric amplification (OPA) of the optical signal when transmitted co-linearly with some pump radiation, the optical signals having carrier angular frequencies within the two principle amplification bands defined by the used optical parametric amplification. Furthermore, the present invention is also related to an optical device comprising an optical circuit with one arm a non-linear optical medium for generating amplified optical signals using OPA and wavelengths specific couplers with three ports to distribute optical signals according to their carrier angular frequency property to different arms of the optical circuit, The invention is based on a priority application EP 04 292 118.9 which is hereby incorporated by reference.

BACKGROUND OF THE INVENTION

Optical fiber technology is currently applied in communication systems to transfer information, e.g. voice signals and data signals, over a long distance as optical signals. Over such long distance, however, the strength and quality of a transmitted optical signal diminish. Accordingly, techniques have been developed to regenerate or amplify optical signals as they propagate along an optical fiber.

One well known amplifying technique called Raman amplification exploits an effect called Raman scattering to amplify an incoming information bearing optical signal. Raman scattering describes the interaction of light with molecular vibration of the material through which the light propagates. And Raman amplification is based on a nonlinear effect of silica which is the main element of optical fibers. When exposed to a radiation, the material of the fiber absorbs a part of the energy (which corresponds to vibrational states of the molecular structure). Incident light scattered by molecules experiences a downshift in frequency from the power bearing optical pump radiation. This downshift in frequency (or increase in wavelength) from the pump radiation is referred to as the Stokes shift and the corresponding scattered light as Stokes-line. In fact, at least a second scattered light can be measured in a symmetric way respective to the optical pump radiation (therefore corresponding to an upshift in frequency) which is referred to as the anti-Stokes-line and considered usually as negligible. The extent of the shift and the shape of the Raman gain curve is determined by the molecular vibrational frequency modes of the transmission medium. In amorphous materials, such as silica, molecular vibrational frequencies spread into bands which overlap and provide a broadband wide gain curve. The efficiency or the characteristics of the Raman effect can be improved by introducing dopants in the fiber like Germanium or Phosphorus. An amplification based on the use of such amorphous material is usually called parametric amplification and is nowadays quite popular for amplifying optical signals partly due to its promise of noiseless signal regeneration.

A well promising amplification is based on the third order optical parametric effect obtained by coupling a signal wave (optical signal of carrier angular frequency $\omega_s$) with pump radiations (of carrier angular frequencies $\omega_{p1}$, $\omega_{p2}$) in an non-optical medium and propagating therefrom to induce the third order optical parametric effect. The optical signal is thus amplified and through a four-wave mixing process (shortened to FWM hereinbelow), a new radiation having a carrier angular frequency $\omega_f$ is generated. Here, the carrier angular frequencies $\omega_s$, $\omega_{p1}$, $\omega_{p2}$, $\omega_f$ of the optical signal, the pump radiation and the FWM generated radiation are governed by the law of conservation of energy as expressed in the following equation:

$$\omega_s + \omega_f = \omega_{p1} + \omega_{p2}.$$

The generated FWM radiation has a mirror symmetry with the spectrum of optical radiation with respect to the carrier angular frequency $(\omega_{p1} + \omega_{p2})/2$, and functions also as the optical phase conjugation radiation for the optical signal. When an optical circuit comprising such a non-linear optical medium is to be used as an FWM radiation generator, it is necessary to pack the carrier angular frequencies $\omega_s$, $\omega_{p1}$ and $\omega_{p2}$ to increase the conversion gain (expressed as FWM radiation intensity/optical signal intensity) of optical signal to FWM radiation, as well as increase the pump radiation intensity. Similarly, when such optical circuit is to be used as an optical parametric amplifier (shortened to OPA hereinbelow), it is necessary to pack the carrier angular frequencies $\omega_s$, $\omega_{p1}$, $\omega_{p2}$ and increase the pump radiation intensity to increase the amplification gain of the optical signal. When the requirement is to amplify optical signals then only latter configuration will be used. In that case, only the amplified optical signals at carrier frequency $\omega_s$ will have to be collected at the output of the optical circuit. All the other radiations i.e. pump radiations $\omega_{p1}$, $\omega_{p2}$ and the generated FWM radiation $\omega_f$ will have somehow to be filtered out to avoid any cross-talk.

It should he noted that, in addition to the generated FWM radiation of a carrier radiation frequency $\omega_{p1} + \omega_{p2} - \omega_s$ (above defined as $\omega_f$) generated in the non-linear optical medium, unwanted FWM radiations of carrier frequencies $2\omega_{p1} - \omega_s$, $2\omega_{p2} - \omega_s$ are produced by the degenerated pump radiations at a spacing $|\omega_{p1} - \omega_{p2}|$ for different optical signals $\omega_s$. For optical signals of different wavelengths as used in wavelength division multiplexed WDM optical signals, if their carrier frequencies and the pump radiation satisfy the expression $\omega_{p1} < \omega_{sj} < \omega_{p2}$ (j=1,2, ... N) the FWM radiation $F_j$ of carrier frequency $\omega_{p1} + \omega_{p2} - \omega_{sj}$ excited by the non-degenerate pump radiations is generated between the frequencies $\omega_{p1}$, $\omega_{p2}$. And the unwanted FWM radiations also called idlers excited by the degenerated pump radiations of carrier frequencies $2\omega_{p1} - \omega_{sj}$, $2\omega_{p2} - \omega_{sj}$ are generated in a range outside the frequencies $\omega_{p1}$, $\omega_{p2}$ (within "secondary" amplification bands). For OPA, not only the FWM radiation $\omega_{fj}$ but also the idlers will have to be filtered out to collect only the amplified optical signals at carrier frequencies $\omega_{sj}$.

There is a limiting case of OPA which is of interest for the amplification of optical signals and corresponds to the case of the use of a single pump radiation. This limiting case, called degenerated OPA, is simply obtained when setting the two pump radiations of carrier frequencies $\omega_{p1}$, $\omega_{p2}$ to be equal. The previously described idlers obtained at $2\omega_{p-s}$ will coincide with the main FWM radiation F of the carrier frequency $\omega_f$ the limiting case of a single used pump radiation of carrier frequency $\omega_p$. In fact, the optical signal of carrier frequency $\omega_s$ and the FWM generated radiation of carrier frequency $\omega_f$ correspond respectively to the Stokes line and to the anti-Stokes line symmetric between each other respective to the pump radiation of carrier frequency $\omega_p$. It must be noted that in the degenerated OPA the generated FWM radiation corresponding to the anti-Stokes line is of an order of the amplified optical signal and is therefore no longer negligible. In fact, it is very important to filter out such generated FWM radiation when collecting the amplified optical signals to avoid any cross-talk or mismatch. The two amplification bands (principle amplification bands) defined in the two pomp OPA in the intervals $[\omega_{p1}, (\omega_{p1}+\omega_{p2})/2]$ and $[(\omega_{p1}+\omega_{p2})/2, \omega_{p2}]$ if $\omega\omega_{p1}<\omega_{p2}$ will now be located on she right and the left of the used pump radiation of carrier frequency $\omega_p$.

In "Interleaver-Based Method for Full Utilization of the Bandwidth of Fiber Optical Parametric Amplifiers and Wavelength Converters" from M. Marhic et al., ThK4, OFC 2003, is presented a method using two parallel fiber optical parametric amplifiers (OPAs) and two interleavers. Such system is used to either amplify or spectrally invert a broad spectrum. Indeed, fiber OPAs can exhibit gain bandwidth of several hundred nanometers. However, if a densely populated wavelength division multiplexed WDM spectrum is presented at the input, covering the entire OPA bandwidth, then at the output the signal and idler spectra overlap completely, and it is not possible to place the idlers in gaps between the signals. Without modification, this fundamental problem limits the usable width of a WDM spectrum to about half the potential full OPA bandwidth. To use the full OPA bandwidth, one needs to use filters to separate the signals into two groups, and amplify them separately.

The method presented in the above paper ThK4 at OFC 2003 is based on the use of an interleaver, to separate even and odd channels. These are then amplified separately, and recombined by another interleaver. With a four-port second interleaver, the signal spectrum and the idler spectrum are simultaneously available from the two output ports. The method requires that the carriers and the interleavers be precisely aligned with a common ITU grid. Therefore, once the architecture is defined and the interleaver chosen, the channel spacing cannot be changed, and the system cannot be upgraded. Moreover, the number of channels is fixed, which is a very serious drawback of such solution.

SUMMARY OF THE INVENTION

In view of the above, it is an object of the present invention to propose a method and provide an optical device for amplifying wavelength division multiplexed optical signals using optical parametric amplification in an optimized way while guaranteeing a maximum flexibility particularly in case of a possible upgrade.

This object is achieved in accordance with the invention by an appropriate separation of the optical signals to be amplified according to their carrier angular frequencies. These angular frequencies are within the two principle amplification bands defined by the used non-linear optical medium for optical parametric amplification. It is advantageously proposed to launch into the non-linear optical medium in one direction the optical signals of carrier frequencies within the one amplification band and in the opposite counter-propagating direction the optical signals of carrier angular frequencies within the other amplification band. The required pump radiation is being launched co-linearly with the respective optical signals to be amplified.

It is also proposed to use wavelength specific couplers with three ports for the optical device to separate optical signals into different paths of an optical circuit comprising the non-linear optical medium. This separation will be performed according to the carrier angular frequency property from optical signals belonging within the first or the second principle amplification bands. This will advantageously allow collection of the amplified optical signals at the output of the optical device, while the unwanted four wave mixing FWM radiations produced within the two principal amplification bands leave the optical device at its input side.

It is also proposed to use an optical device according to the invention comprising four couplers defining a figure-eight optical circuit made out of two closed paths. One of these paths is connected to the input of the optical device by one of such couplers. The other is connected to the output of the optical device by another coupler. Both closed paths have a common arm comprising the non-linear optical medium used for the OPA while being interconnected with the two closed paths at both ends by respective coupler to collect the optical amplified signals at the output of the optical device, while the unwanted idlers produced within the two principal amplification bands leave at its input.

In the case of degenerated OPA i.e. use of a single pump radiation, it is of advantage that the used couplers for the optical device according to the invention are defined by a wavelength cut-off for the separation limit being closed but not equal to the required pump radiation.

Advantageous developments of the invention are described in the dependent claims, the following description and the drawings.

DESCRIPTION OF THE DRAWINGS

An exemplary embodiment of the invention will now be explained further with the reference to the attached drawings in which.

DETAILED DESCRIPTION OF PREFERRED EMBODIMENTS

Figure 1:
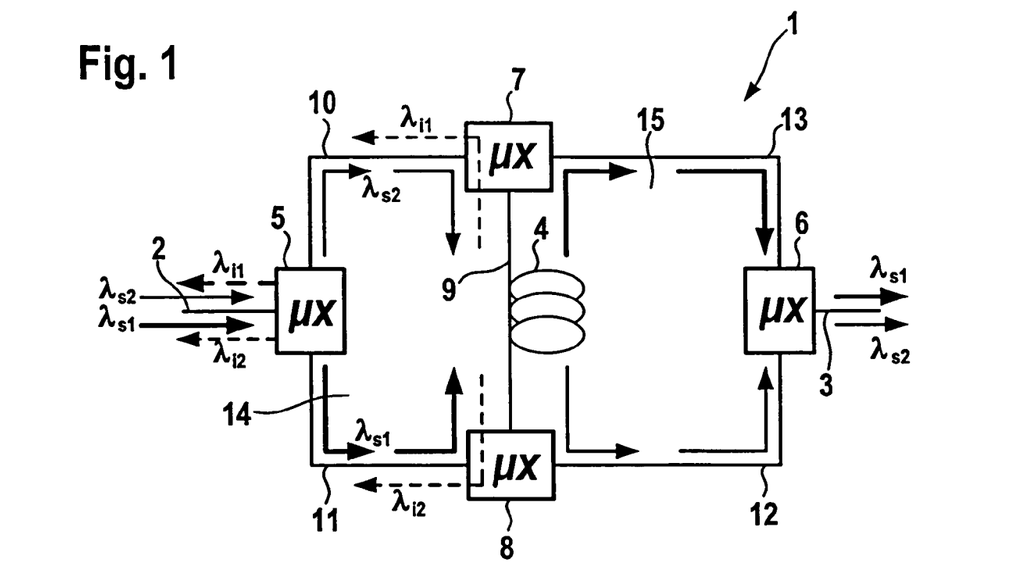
FIG. 1 shows a schematic view of an optical circuit according to the invention with the propagation paths of optical signals belonging to the two principle amplification bands.

On FIG. 1 is shown an optical circuit 1 according to the invention. It comprises four optical couplers 5 to 8 each with three ports and defining a figure-eight optical circuit made out of two closed paths 14, 15. One closed path 14 is connected to the input 2 of the optical device by the coupler 5. The other closed path 15 is connected to the output 3 of the optical device by another coupler 6. Both closed paths 14, 15 have a common arm 9 comprising the non-linear optical medium 4 in the form of a fiber OPA. This path 9 is interconnected with the two closed paths 14, 15 at both ends by a respective coupler 7, 8.

The four used couplers 5 to 8 are wavelength specific couplers, preferably but not exclusively chosen as multiplexers. They are defined such that the optical signals to be amplified are separated into two different paths of the optical circuit 1. The separation is performed according to the carrier angular frequency property from the optical signals belonging within the first or the second principle amplification bands defined by the used optical parametric amplification.

Figure 8A:
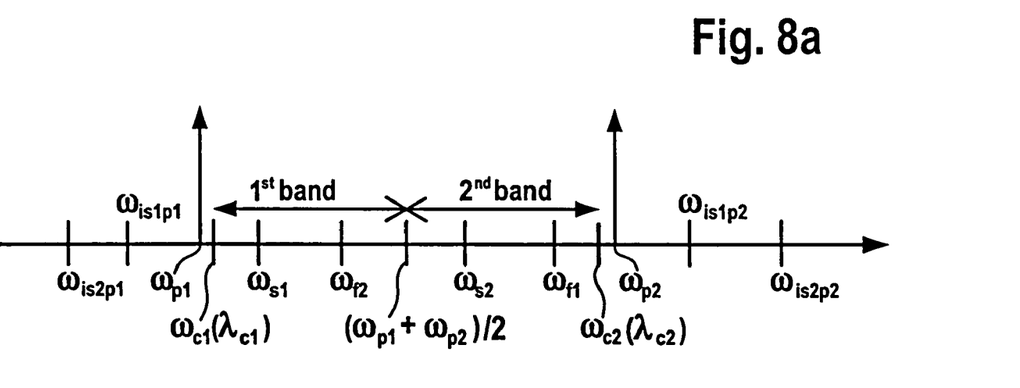
FIGS. 8a and 8b show the location of the two principle bands in relation with the carrier angular frequencies of the used pump radiations.

On FIG. 1 is shown also the typical propagation paths of optical signals $\lambda_{s1}$ (having carrier angular frequency $\omega_{s1}$) and $\lambda_{s2}$ (having carrier angular frequency $\omega_{s2}$) belonging to respectively the two principle amplification bands defined by the ranges $[\omega_{p1}, (\omega_{p1}+\omega_{p2})/2]$ and $[(\omega_{p1}+\omega_{p2})/2, \omega_{p2}]$ with $\omega_{p1}$ and $\omega_{p2}$ being the carrier angular frequencies of the two used pump radiations and $\omega_{p1}<\omega_{p2}$ (see energy spectrum on FIG. 8a in carrier angular frequency scale). The four used wavelength specific couplers 5 to 8 have the same wavelength cut-off $\lambda_e$ (carrier angular frequency $\omega_e$) for the separation limit of the two principle amplification bands. In that case and according to the invention, the optical signals $\lambda_{s1}, \lambda_{s2}$ are separated by the coupler 5 at the input 2 into two different paths 10 and 11 of the first closed path 14. Both paths 10, 11 lead each to a coupler 7, 8 connected to the respective end of the path 9 comprising the non-linear optical medium 4. In such a way the optical signal $\lambda_{s1}$ ($\omega_{s1}$) within the one amplification band is launched by the coupler 8 into the fiber OPA (non-linear optical medium 4) in one direction while the optical signals $\lambda_{s2}$ ($\omega_{s2}$) within the other amplification band is launched by the coupler 7 in the opposite counter-propagating direction. The optical signals $\lambda_{s1}, \lambda_{s2}$, after being amplified by OPA at the fiber 4 will leave the first closed path 14 to be directed at the two paths 13, 12 leading to the coupler 6 of the second closed path 15 connected to the output 3 of the optical device. The required pump radiations are not shown on FIG. 1 but are launched co-linearly with the respective optical signals for the amplification to take place at the non-linear optical medium 4.

On FIG. 1 is shown the optical device used according to the invention in the case of the degenerated OPA i.e. the one pump parametric amplifier with the use of a single pump radiation of carrier angular frequency $\omega_p$ (limiting case corresponding to $\omega_{p1}=\omega_{p2}=\omega_p$ and the two principal amplification bands defined now respectively by $\omega_s<\omega_p$ and $\omega_s>\omega_p$). In that case, the cut-off wavelength of the couplers 5 to 8 must be a little longer or shorter (about 2 nm) than the pump wavelength (proportional to the inverse of $\omega_p$). Then, the pump radiation propagates in the amplifier either like optical signals belonging to the first band or the second band. Furthermore, the unwanted Four-Waves Mixing FWM radiations (idlers) are generated with the carrier angular frequency corresponding to $2\omega_p-\omega_s$ for the optical signal of carrier angular frequency $\omega_s$.

Figure 8B:
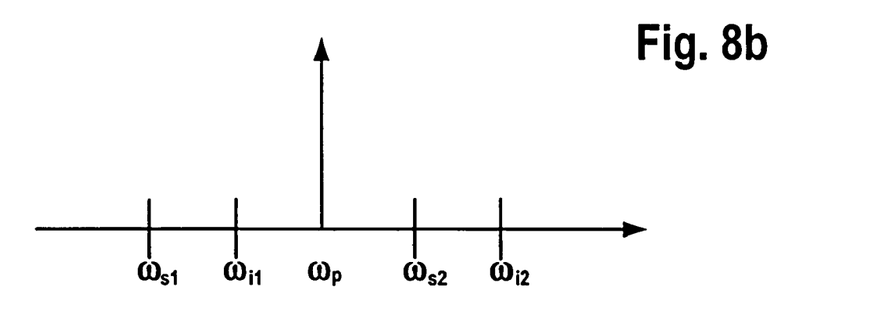

Such unwanted FWM waves are generated symmetrically respective to the pump radiation of carrier angular frequency $\omega_p$ like an anti-Stokes line. In that case, for an optical signal $\lambda_{s1}$ with carrier angular frequency within the first amplification bond defined by $\omega<\omega_p$ an idler $\lambda_{i1}$ is generated with carrier angular frequency within the second principle amplification band defined by $\omega>\omega_p$ (see energy spectrum on FIG. 8b in carrier angular frequency scale). In a same way, an optical signal $\lambda_{s2}$ with carrier angular frequency within the second principle amplification band generates an idler $\lambda_{i2}$ with carrier angular frequency within the first principle amplification band. The use of an optical device with an optical circuit made out of the four couplers 5 to 8 will have the advantage as shown on FIG. 1 to lead the unwanted produced FWM radiations i.e. on FIG. 1 $\lambda_{i1}$ and $\lambda_{i2}$ to the input 2 of the optical device. In such a way, it is possible to collect at the output 3 of the optical device solely the amplified optical signals $\lambda_{s1}$ and $\lambda_{s2}$. Therefore, there is no need of any filters for the idlers at the output and no cross-talks or mismatch between the idlers and the optical signals can take place.

In the case of a degenerated OPA, for the required pump radiation, only a single radiation at carrier angular frequency $\omega_p$, will have to be injected in the non-linear optical medium 4 in both directions co-linearly with the optical signals to be amplified. For that, two different implementations can be applied.

On FIG. 1 is shown a first implementation which divides the pump radiation in two and injects it into the optical circuit 1 both by its input 2 and its output 3. In the case that the cut-off wavelength of the couplers is chosen so that the pump radiation propagates like an optical signal with carrier angular frequency within the first band, the pump radiation injected at the input 2 will follow in the first closed path 14, the arm 10 to he injected into the arm 9 comprising the fiber OPA in one direction while the pump radiation injected at the output 3 will follow the arm 12 of the closed path 15 to be injected into the arm 9 in a counter-propagating way.

Figure 3:
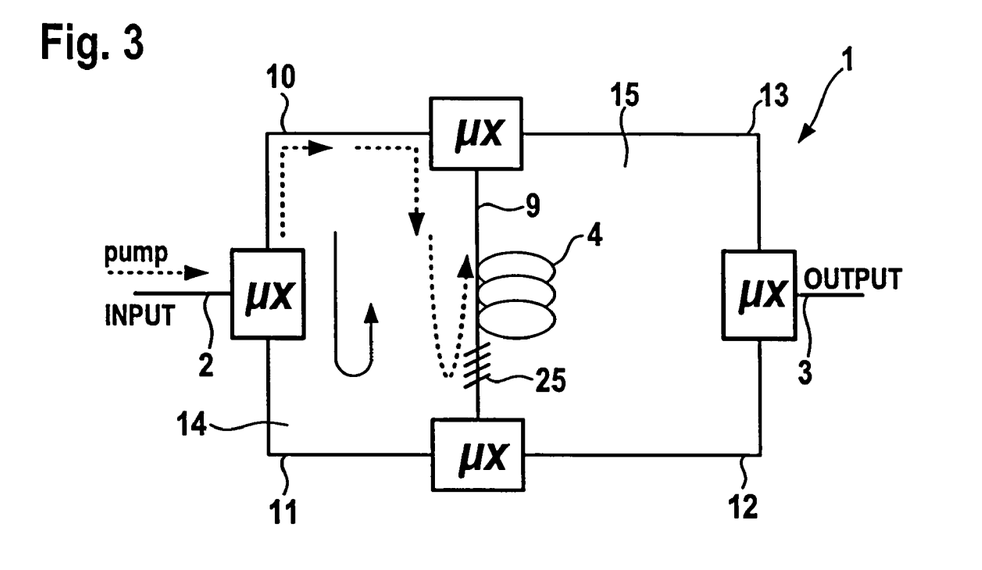
FIG. 3 shows a schematic view of an alternative architecture for an optical circuit in the case of the degenerated OPA according to the invention.

On FIG. 3 is shown a similar optical circuit 1 comprising this time a supplementary mirror 25 on the arm 9 together with the non-linear optical medium 4. Such mirror can he chosen as a fiber Bragg grating optimized to reflect the pump radiation of carrier angular frequency $\omega_p$. In that case, it is no longer necessary to divide the pump radiation in two since the pump radiation can now be injected only from one side e.g. from the input of the optical device as shown on FIG. 3.

Figure 2:
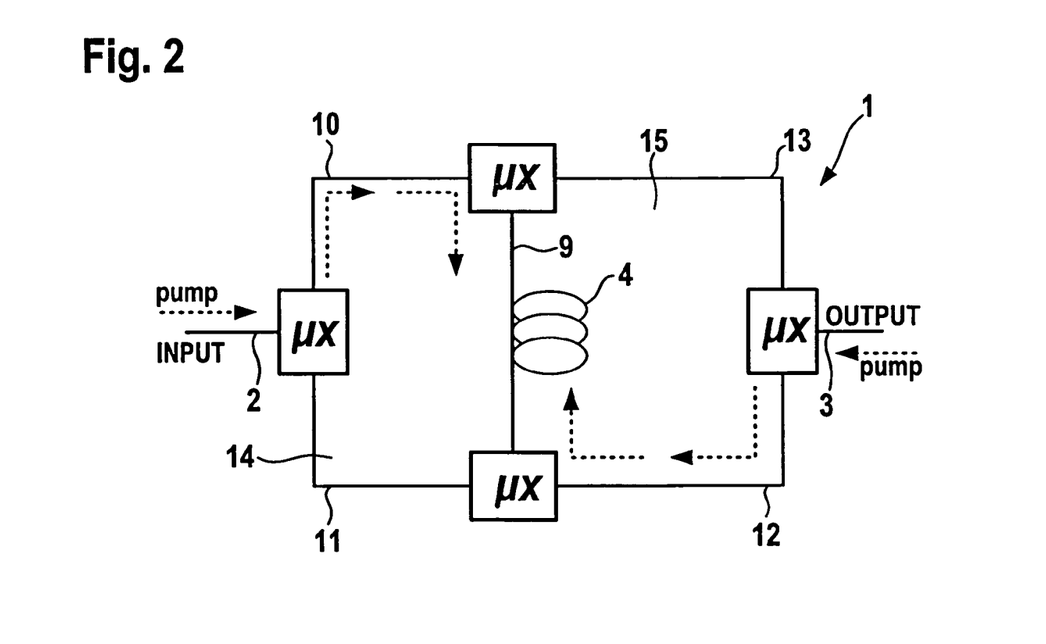
FIG. 2 shows the optical circuit according to figure 1 with the propagation paths of the pump radiation in the degenerated OPA case.
Figure 4:
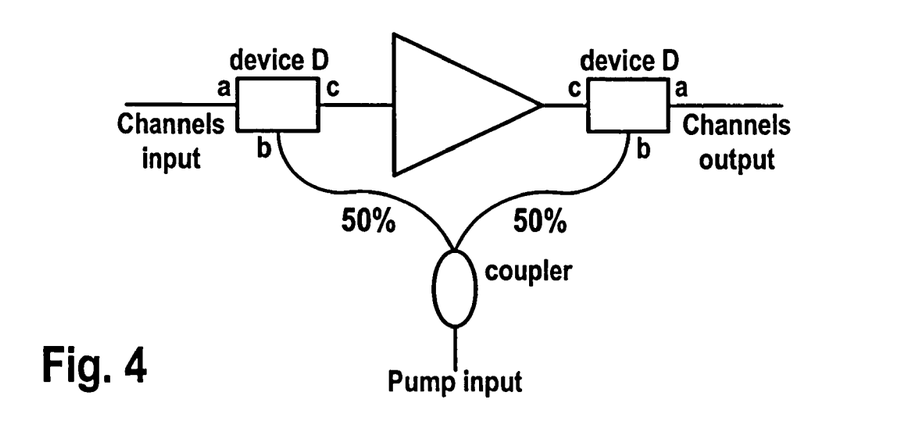
FIG. 4 shows an implementation of the optical circuit into the optical device for degenerated OPA according to the invention.

In the case of symmetric injection of the pump radiation as shown on FIG. 2, an architecture for the optical device as sketched on FIG. 4 can be used. The device D couples pump radiation and channels of the WDM optical signals. Between the two devices D is placed the optical circuit 1. The full band, except for the pump radiation should be transmitted from port a to port c (and reciprocally). Only the pump radiation should be transmitted from port b to port c (and reciprocally). An optical device according to such architecture could be realized by using thin film technology as in conventional multiplexer but, replacing the wave band splitter function by a notch filter or Fabry-Perot type function centered at the wavelength corresponding to the pump radiation and reflecting only that corresponding pump radiation. Similarly, it is possible to use a filter which reflects all channels except the pump radiation.

For OPA with two different pump radiations of carrier angular frequencies $\omega_{p1}$ and $\omega_{p2}$ and if $\omega_{p1}<\omega_{p2}$ the two principle amplification bands are defined in the ranges $[\omega_{p1}, (\omega_{p1}+\omega_{p2})/2]$ and $[(\omega_{p1}+\omega_{p2})/2, \omega_{p2}]$. If the WDM channels of the optical signals and the used pump radiations satisfy the expression $\omega_{p1}<\omega_{sj}<\omega_{p2}$ (j=1, 2, ... N) for N channels then the optical signals will belong to the first or second amplification hand if respectively they are less or greater than $(\omega_{p1}+\omega_{p2})/2$. For each amplified optical signal $\omega_{sj}$ ($\lambda_{sj}$) will be generated a FWM radiation at $\omega_{p1}+\omega_{p2}-\omega_{sj}$ i.e. a FWM radiation within the second amplification band if $\omega_{sj}$ is within the first amplification band and vice-versa. These correspond to the idlers in the degenerated case. On top of that, supplementary unwanted couple of idlers are generated at carrier angular frequencies $(2\omega_{p1}-\omega_{sj}, 2\omega_{p2}-\omega_{sj})$, i.e. in a range outside the two amplification bands (at secondary amplification bands). On FIG. 8a is shown the respective location on the energy spectrum (carrier angular frequency scale) of the couple of idlers ($\omega_{is1p1}$, $\omega_{is1p2}$), and ($\omega_{is2p1}$, $\omega_{is2p2}$) corresponding to the optical signals $\omega_{s1}$, $\omega_{s2}$.

But such supplementary couple of idlers are not so dramatic as the initial FWM radiation since those idlers are generated outside the principal bands where the WDM optical signals are located. Therefore, no cross-talk can take place between the optical signals and those idlers.

Figure 5:
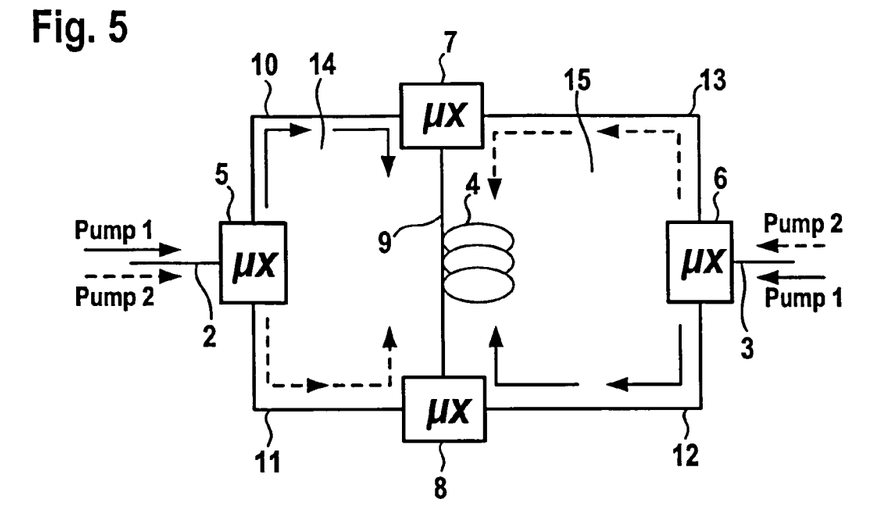
FIG. 5 shows the propagation paths of the used two pump radiations alone the optical circuit according to FIG. 1.
Figure 6:
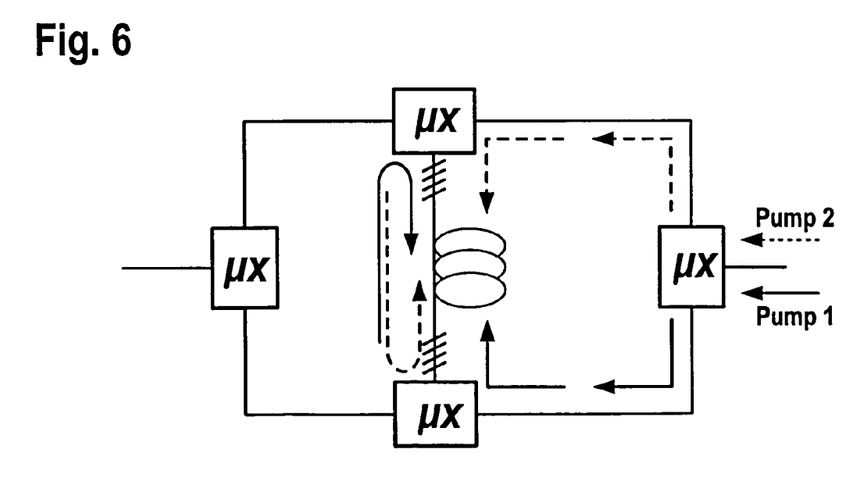
FIG. 6 shows an alternative architecture when using two pump radiations.
Figure 7:
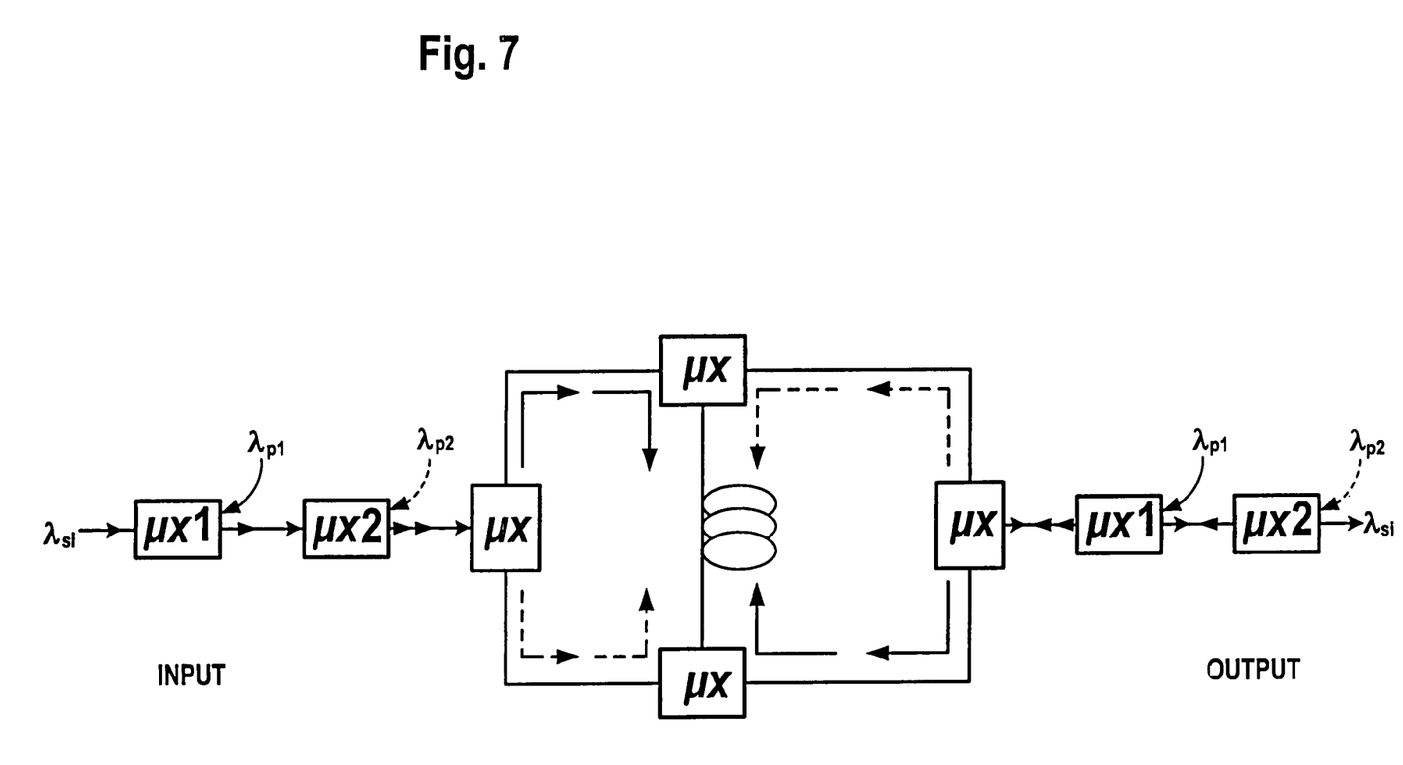
FIG. 7 shows an architecture of the optical circuit when used with two pump radiations according to the invention.

In this case, the cut-off wavelengths of the couplers 5 to 8 must he chosen to correspond to the inverse of ($\omega_{p1}+\omega_{p2}$)/2. This time, it may be judicious to choose exactly that value. The same alternative implementation as proposed in the case of a single pump radiation at FIGS. 2 and 3 can he also applied for the case of the use of two pump radiations. On FIG. 5 is shown the implementation with symmetric injection of the two pump radiations i.e. from the input 2 as well as the output 3 of the optical device. On FIG. 6 is shown an alternative implementation where pump radiations are injected only by one end, here the output 3. In that case, two mirrors 25, 26 must be inserted on the path 9 flanking the non-linear optical medium 4. Such two mirrors 25, 26 are preferably but not exclusively chosen as two Fabry-Perot gratings, and must be centered at the wavelengths corresponding respectively to each pump radiation to ensure co-propagation and contra-propagation of the pump radiations. Due to the different situation is hen using two pump radiations of carrier angular frequencies $\omega_{p1}$ and $\omega_{p2}$ for each optical signal at carrier angular frequency $\omega_{sj}$ and the generation of two idlers one less than $\omega_{p1}$ and the other bigger than $\omega_{p2}$, supplementary couplers can be used at the input 2 and output 3 of the optical device. On FIG. 7 is shown an optical device according to the invention wish the optical circuit 1 as on FIG. 1 and two supplementary couplers 16, 18 and 20. 22 respectively at its input 2 and output 3. The couplers 16, 20 and 18, 22 can be chosen as multiplexers with a cut-off wavelength corresponding respectively to the carrier angular frequency $\omega_{c1}$ and $\omega_{c2}$ as defined on FIG. 8a. In such a way, it is possible to couple first pump radiation of carrier angular frequency $\omega_{p1}$, 17, 21, at couplers 16, 20 and second optical radiation of carrier angular frequency $\omega_{p2}$, 19, 23, at couplers 18, 22 with the WDM channels of the optical signals to be amplified. The judicious choice of the cut-off wavelengths of the two couplers 20, 22 at the output of the optical device permits collection of the amplified optical signals without any idlers ($\omega_{is1p1}$, $\omega_{is1p2}$), ($\omega_{is2p1}$, $\omega_{is2p2}$).

All these solutions according to the invention enable doubling of the useable amplification bandwidth. Furthermore, they do not depend on the channel spacing and the number of used channels. Therefore, it has the big advantage of not being limited when an optical device according to the invention is already implemented onto an optical system while the number of used channels is increased as long as the channels are within the two principle amplification bands defined by the used optical parametric amplification and the cut-oil of the couplers.

The invention claimed is:

1. A method for amplifying wavelength division multiplexed optical signals, comprising:
   transmitting the optical signals co-linearly with pump radiation;
   using an optical device comprising a non-linear optical medium to perform optical parametric amplification of the optical signals;
   launching optical signals with carrier angular frequencies within a principal amplification band into the non-linear optical medium in a first direction; and
   launching optical signals with carrier angular frequencies within another principal amplification band into the non-linear optical medium in a counter-propagating direction with respect to the first direction,
   wherein the two principal amplification bands are defined by the optical parametric amplification.

2. The method according to claim 1, wherein the optical device further comprises wavelength-specific couplers with three ports to separate the optical signals into two different paths of an optical circuit.

3. The method according to claim 2, further comprising collecting amplified optical signals at the output of the optical device, wherein four wave mixing radiation within the two principal amplification bands leaves the optical device at an input side.

4. The method according to claim 3, further comprising using supplementary wavelength-specific couplers at the output of the optical circuit,
   wherein each wavelength-specific coupler has a wavelength cut-off which is based on a wavelength of a pump radiation to be filtered out,
   and the amplified optical signals are collected without idlers.

5. The method according to claim 2, wherein the wavelength-specific couplers have a wavelength cut-off which is close to, but not equal to, a wavelength of the pump radiation for degenerated optical parametric amplification.

6. The method according to claim 1, further comprising launching the pump radiation into the optical device in a symmetric way from an input side and an output side of the optical device.

7. An optical device comprising:
   an optical circuit comprising a non-linear optical medium which amplifies optical signals with carrier angular frequencies within two principal amplification bands which are defined by optical parametric amplification of the optical signals; and
   wavelength-specific couplers with three ports which distribute the optical signals to different arms of the optical circuit based on the carrier angular frequency of the optical signals;
   wherein the wavelength-specific couplers are distributed within the optical circuit to launch optical signals with carrier angular frequencies within a principal amplification band into the non-linear optical medium in a first direction, and optical signals with carrier angular frequencies within another principal amplification hand into the non-linear optical medium in a counter-propagating direction with respect to the first direction, and
   the pump radiation is launched co-linearly with the optical signal.

8. The optical device according to claim 7, wherein four couplers define a figure-eight optical circuit with two closed paths,
   one closed path is connected to an input of the optical device by one of the couplers.
   the other closed path is connected to an output of the optical device by another coupler,
   the closed paths share a common arm which comprises the non-linear optical medium,
   the common arm is connected with the two closed paths at both ends by a coupler which collects the amplified optical signals at the output of the optical device, and
   four wave mixing radiation within the two principal amplification bands leaves the optical device at the input.

9. The optical device according to claim 8, further comprising a mirror on an arm with the non-linear optical medium,
  wherein the mirror is wavelength-specific,
  the mirror reflects the pump radiation to propagate in both directions through the non-linear optical medium,
  and the pump radiation is launched from only one port of the optical device.

10. The optical device according to claim 8, further comprising supplementary wavelength-specific couplers at the output of the optical circuit,
  wherein each wavelength-specific coupler has a wavelength cut-off which is based on a wavelength of a pump radiation to be filtered out, and
  the amplified optical signals are collected without idlers.

11. The optical device according to claim 7, wherein the wavelength-specific couplers have a wavelength cut-off which is close to, but not equal to, a wavelength of the pump radiation for degenerated optical parametric amplification.

* * * * *